United States Patent [19]

Kish

[11] 4,142,843
[45] Mar. 6, 1979

[54] COMPRESSOR BLOCK AND TUBE ASSEMBLY

[75] Inventor: Arthur S. Kish, Lyndhurst, Ohio

[73] Assignee: Murray Corporation, Cockeysville, Md.

[21] Appl. No.: 782,767

[22] Filed: Mar. 30, 1977

[51] Int. Cl.² ............... F04B 39/12; F16L 13/14
[52] U.S. Cl. ............................. 417/313; 285/382.4; 285/382.5
[58] Field of Search ............ 285/382.4, 382.5; 417/313

[56] References Cited

U.S. PATENT DOCUMENTS

| | | | |
|---|---|---|---|
| 673,971 | 5/1901 | Bartliff | 285/382.5 |
| 2,485,960 | 10/1949 | Donahue | 285/382.5 |
| 3,092,404 | 6/1963 | MacWilliam | 285/333.4 |
| 3,428,338 | 2/1969 | Corwin | 285/382.4 |
| 3,432,916 | 3/1969 | Fisher et al. | 285/382.4 |
| 3,787,945 | 1/1974 | Pasek | 285/382.5 |
| 3,817,562 | 6/1974 | Cook | 285/382.5 |
| 3,827,255 | 8/1974 | Kish | 62/296 |
| 3,930,298 | 1/1976 | Ridenour | 285/382.5 |

Primary Examiner—William L. Freeh
Attorney, Agent, or Firm—Isler & Ornstein

[57] ABSTRACT

A compressor block and tube assembly is disclosed having spaced openings for the reception of the ends of tubes for admitting fluid to and from a compressor. Means are provided for interlocking the tubes to the block, whereby relative axial movement of the tubes in said openings is avoided. The tubes are provided with conical shoulders and beads for this purpose, and O-rings are interposed between the beads and the block to provide leak-proof seals between the tubes and block. The block is of such design as to facilitate production in mass quantities.

2 Claims, 8 Drawing Figures

COMPRESSOR BLOCK AND TUBE ASSEMBLY

This invention relates, as indicated, to a compressor block and tube assembly, but has reference more particularly to such a block and tube assembly which is adapted for use in automobile air-conditioning systems.

PRIOR ART

In my U.S. Pat. No. 3,827,255, there is disclosed the back plate 42 of a compressor of an air-conditioning assembly of a type used by General Motors, said back plate having an inlet passageway 43 for passage of the refrigerant into the compressor through a conduit 8, and an outlet passageway 44 for passage of the fluid refrigerant into the muffler 12 through a conduit 13.

Secured to the back plate 42, as by a clamp bar 45, stud 46 and nut 47, is a compressor block 15. The block 15 is provided with a bore which extends radially through the block and into which the end of the conduit 8 is press-fitted, and with an extension extending at right angles to the said bore and which extends into the passageway 43. The block 15 is also provided with an extension 23 which extends into the passageway 44, and with a bore 32 which extends radially through the block and into which the conduit 13 is press-fitted.

In my aforesaid patent, the conduits 8 and 13 are connected to the block 15 in such a manner as to provide joints which are not leak-proof, while the block 15 is similarly connected to the passageways 43 and 44 in the back plate in such a manner as to provide joints which are not entirely leak-proof.

Aside from this, the connection of the conduits 8 and 13 to the compressor block 15 is such as to render it difficult to bend the conduits to desired forms or curvatures, without causing a loosening of these connections, and thereby introducing additional chances of leakage of the refrigerant at these joints.

THE PRESENT INVENTION

The present invention has, as its primary object, the provision of a compressor block and tube assembly which overcomes all of the aforesaid disadvantages of the prior art, and is adaptable for use in air-conditioning systems of a large variety of automobiles.

Another object of the invention is to provide a compressor block and tube assembly which is virtually leak-proof.

A further object of the invention is to provide a compressor block of unique design, which can be mass-produced, at low cost, and used for compressors of air-conditioning systems of General Motors and Ford automobiles.

Other objects and advantages of my invention will be apparent during the course of the following description.

In the accompanying drawings forming a part of this specification, and in which like numerals are employed to designate like parts throughout the same, FIG. 1 is a fragmentary view of a portion of an air-conditioning system for a Chevrolet or like automobile, and embodying the compressor block and tube assembly of the present invention;

Figure 1:
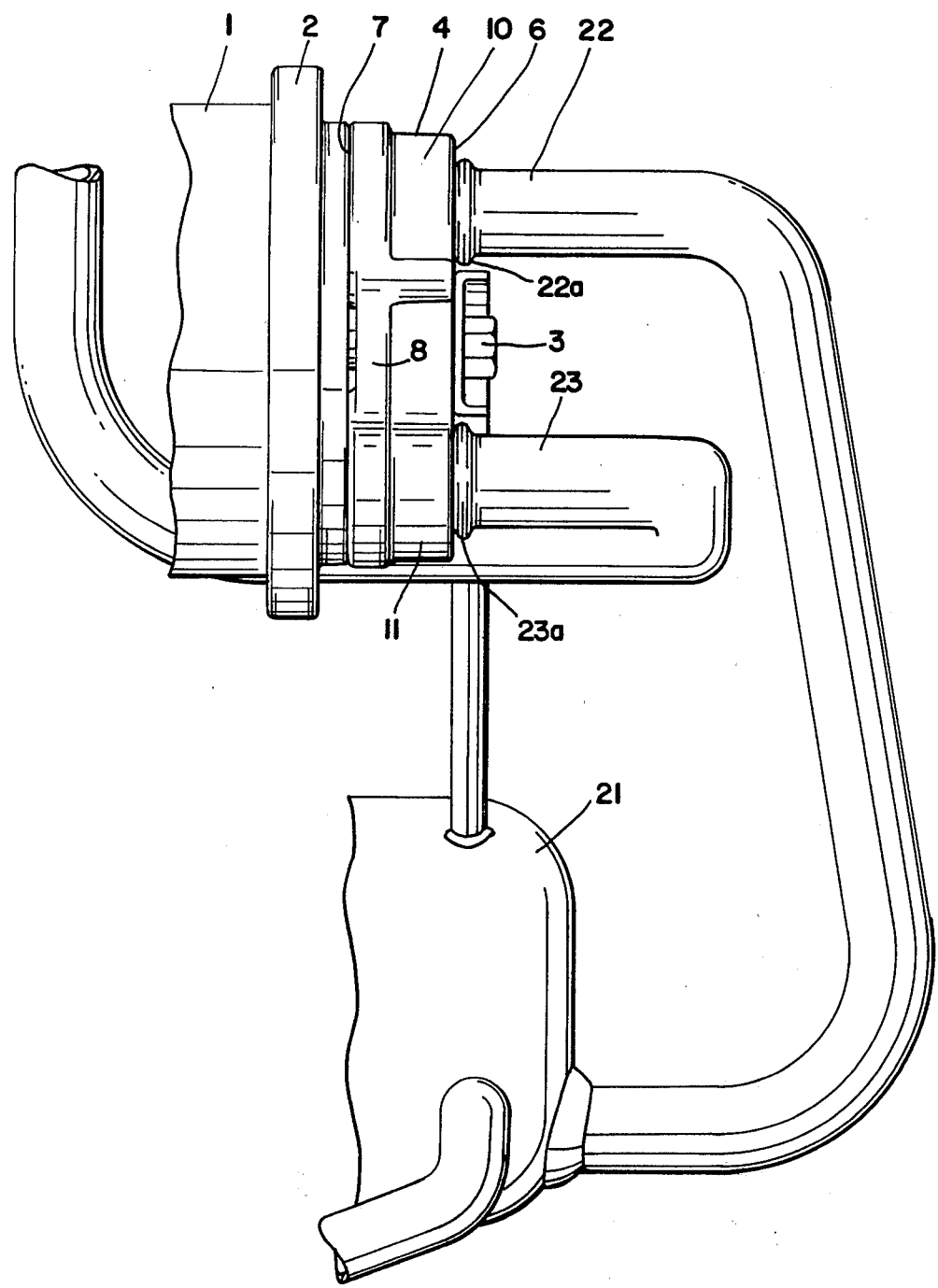
Figure 2:
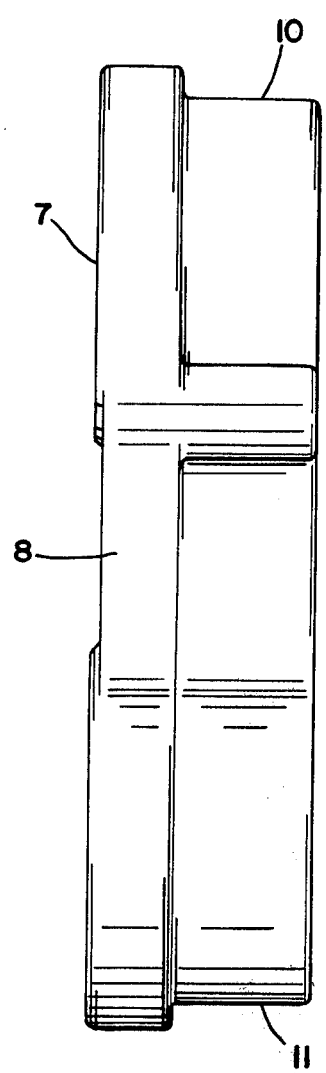
FIG. 2 is a side elevational view, on an enlarged scale, of the compressor block.

Referring more particularly to the drawings, reference numeral 1 designates a portion of the compressor of an automobile air-conditioning system, of which compressor the back plate is designated by reference numeral 2.

Figure 6:
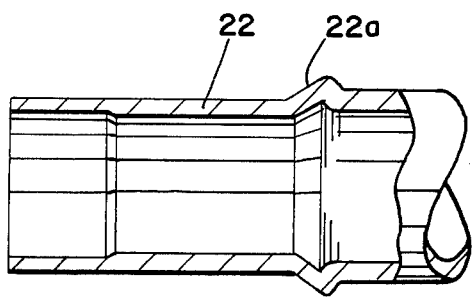
FIG. 6 is a fragmentary cross-sectional view, of one end of a tube which is a part of the compressor block and tube assembly.
Figure 7:
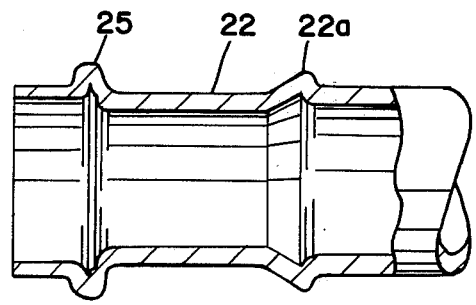
FIG. 7 is a view similar to FIG. 6, but showing the end of the tube formed for connection to the compressor block.

The back plate 2 is provided with an inlet passageway (not shown) which corresponds to the inlet passageway 43 of the back plate 42 in FIG. 6 of my U.S. Pat. No. 3,827,255, and an outlet passageway (not shown) which corresponds to the outlet passageway 44 in FIG. 6 of my aforesaid patent.

Secured to the back plate 2, as by a bolt 3, is a compressor block, designated generally by reference numeral 4.

The compressor block 4 is molded as a die-casting, preferably from ASTM 353 Alloy, and is provided with an opening 5, through which the bolt 3 extends, for the purpose of securing the compressor block 4 to the back plate 2.

The compressor block 4 is of the configuration shown in FIGS. 1, 2, 3, 4 and 5, having parallel faces 6 and 7, and a peripheral face interconnecting the faces 6 and 7, consisting of substantially parallel linear portions 8 and 9, and arcuate portions 10 and 11, which are interconnected by the portions 8 and 9.

Figure 3:
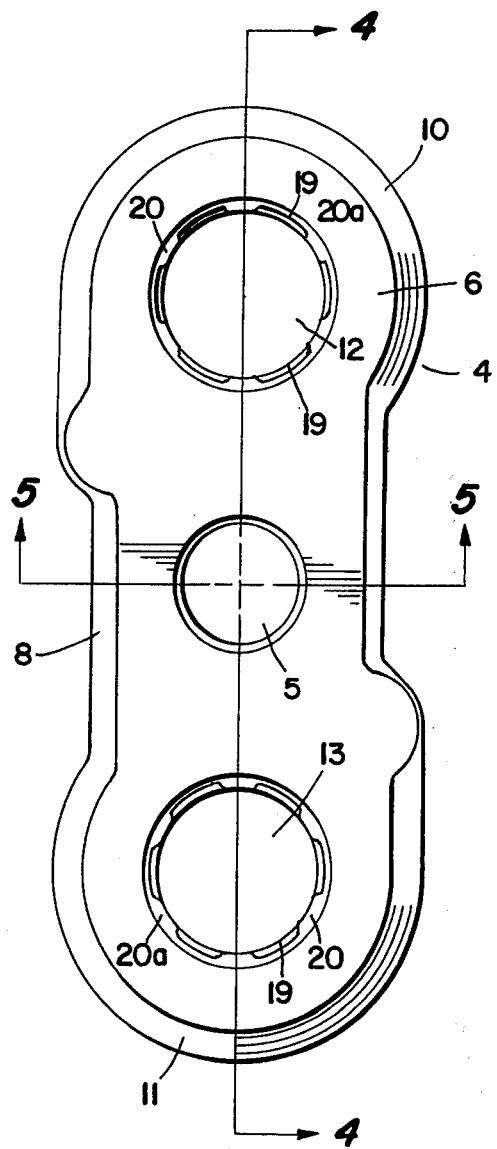
FIG. 3 is a top plan view of the compressor block of FIG. 2.
Figure 4:
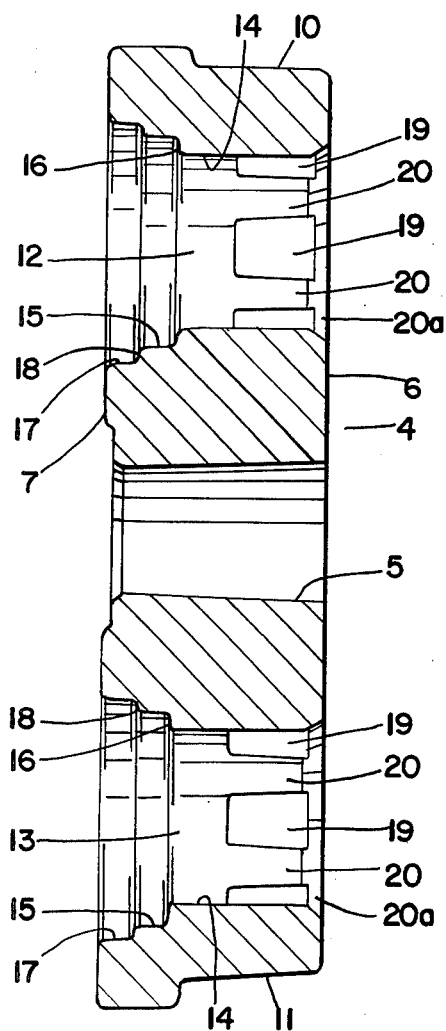
FIG. 4 is a cross-sectional view, taken on the line 4—4 of FIG. 3.
Figure 5:
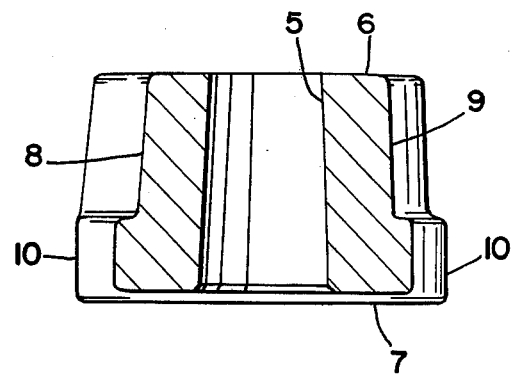
FIG. 5 is a cross-sectional view, taken on the line 5—5 of FIG. 3.
Figure 8:
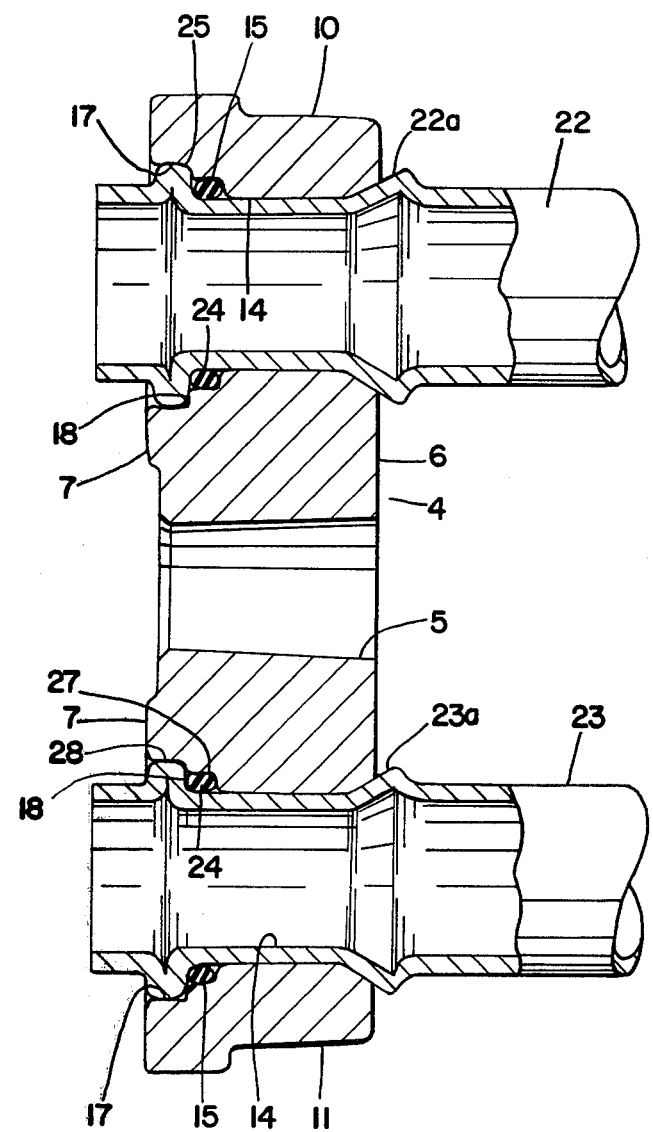
FIG. 8 is a view similar to FIG. 4, but showing the completed compressor block and tube assembly.

As best seen in FIGS. 3, 4 and 8, the compressor block 4 is molded to provide openings or holes 12 and 13, which are concentric with the arcuate portions 10 and 11 respectively of the block.

As best seen in FIGS. 3, 4 and 8, each of the openings or holes 12 and 13 is provided with a cylindrical wall 14, at one end of which an annular recess 15 is provided, the junction of the hole 12 and 13 with the recess 15 forming a shoulder or abutment 16. At one end of the annular recess 15, a second annular recess 17 is provided, of a larger diameter than the recess 15, the junction of the recesses 15 and 17 forming a shoulder or abutment 18.

The cylindrical walls 14 are provided at their other ends with circumferentially spaced slots 19, which are tapered longitudinally, so as to provide splines 20 therebetween. The slots and splines terminate in a conical seat 20a.

Referring more particularly to FIGS. 1, 6, 7 and 8, the hole 12 of the compressor block 4 is adapted to be interconnected with the muffler 21 of the air-conditioning system by means of a tube 22, while the hole 13 of the compressor block 4 is adapted to be interconnected with the evaporator (not shown) of the air-conditioning system by means of a tube 23.

For the purpose of connecting the tube 22 to the compressor block 4, a portion of the tube, as seen in FIGS. 6 and 8, is formed or upset to provide a conical shoulder 22a. The portion of the tube to the left of the shoulder 22a, as seen in FIG. 6, is then inserted through the hole 12, the outside diameter of this portion being substantially the same as the inside diameter of the hole 12, so that this portion of the tube has a slip fit in the hole. This brings the shoulder 22a of the conduit 22 into seated engagement with the seat 20a of the compressor block.

An O-ring 24 is then inserted in the recess 15 of the compressor block, after which the end of the conduit is upset to provide a bead 25, which seats in the recess 17 and forces the O-ring against the shoulder 16, and thereby provides a tight leak-proof seal between the compressor block and the back plate 2 of the compressor. The portion of the conduit 22 to the left of the bead 25, as seen in FIG. 8, is of an outside diameter the same as the inside diameter of the outlet passageway 44 in my aforesaid patent, and is adapted to fit slidably into the end of that passageway.

For the purpose of connecting the tube 23 to the compressor block 4, a portion of the tube, as seen in FIG. 8, is formed or upset to provide a conical shoulder 23a. The portion of the tube to the left of the shoulder 23a, is then inserted through the hole 13, the outside diameter of this portion being substantially the same as the inside diameter of the hole 13, so that this portion of the conduit has a slip fit in the hole. This brings the shoulder 23a into seated engagement with the seat 20a of the compressor block.

An O-ring 27 is then inserted in the recess 15 of the compressor block, after which the end of the tube 23 is upset to provide a bead 28 which seats in the recess 17, and forces the O-ring against the shoulder 16, and thereby provides a tight leak-proof seal between the compressor block and the back plate 2 of the compressor. The portion of the tube 23 to the left of the bead 28, as seen in FIG. 8, is of an outside diameter the same as the inside diameter of the inlet passageway 43 in my aforesaid patent, and is adapted to fit slidably into the end of that passageway.

In forming the beads 25 and 28, the tubes 22 and 23 are expanded sufficiently to cause the tubes to interlock with the splines 20, and thereby securely lock the tubes to the compressor block.

It is thus seen that I have provided a compressor block and tube assembly which overcomes all of the disadvantages of the prior art compressor block and tube assemblies; in which the compressor block and tube assembly is virtually leak-proof, and in which the compressor block is of such a design that it can be mass-produced, at low cost, and used for compressors of air-conditioning systems of a large variety of cars.

It is to be understood that the form of my invention herewith shown and described, is to be taken as a preferred example of the same, and that various changes may be made in the shape, size and arrangement of parts thereof, without departing from the spirit of the invention or the scope of the subjoined claims.

Having thus described my invention I claim:

1. A compressor block and tube assembly comprising a compressor block having spaced cylindrical holes extending partially through said block, a first annular recess adjacent one end of each of said holes and of a diameter larger than that of said holes, whereby to provide a shoulder or abutment at the junction of said one end of said holes and said recess, a second annular recess ajacent said first annular recess and of a diameter larger than that of the first recess, whereby to provide a shoulder or abutment at the junction of said second annular recess and said first annular recess, a conical seat adjacent the other end of each of said holes, circumferentially spaced splines in the walls of said holes extending from substantially the midpoints thereof to said conical seats, a tube extending through each of said holes, with the portion of the tubes which extend through said holes being of substantially the same outside diameter as the inside diameter of said holes, so that said portions have a slip fit in said holes, said tubes having shoulders in abutment with said concial seats, each of said tubes having an annular bed disposed in said second annular recesses, each of said beads having an outside diameter substantially the same as that of said second annular recesses, whereby said beads substantially fill said second annular recesses, said bead and conical seat locking said tubes against axial movement relatively to the axes of said holes and said splines being interlocked with the exterior walls of said tubes locking said tubes against rotational movement in said holes, and O-rings disposed in said first annular recesses, and providing leak-proof seals between said block and said tubes.

2. An assembly, as defined in claim 1, wherein said second annular recesses are of substantially rectangular cross-section.

* * * * *